Oct. 31, 1939.  W. MAXWELL  2,178,105
TRACTION WHEEL
Filed March 11, 1939  2 Sheets-Sheet 2
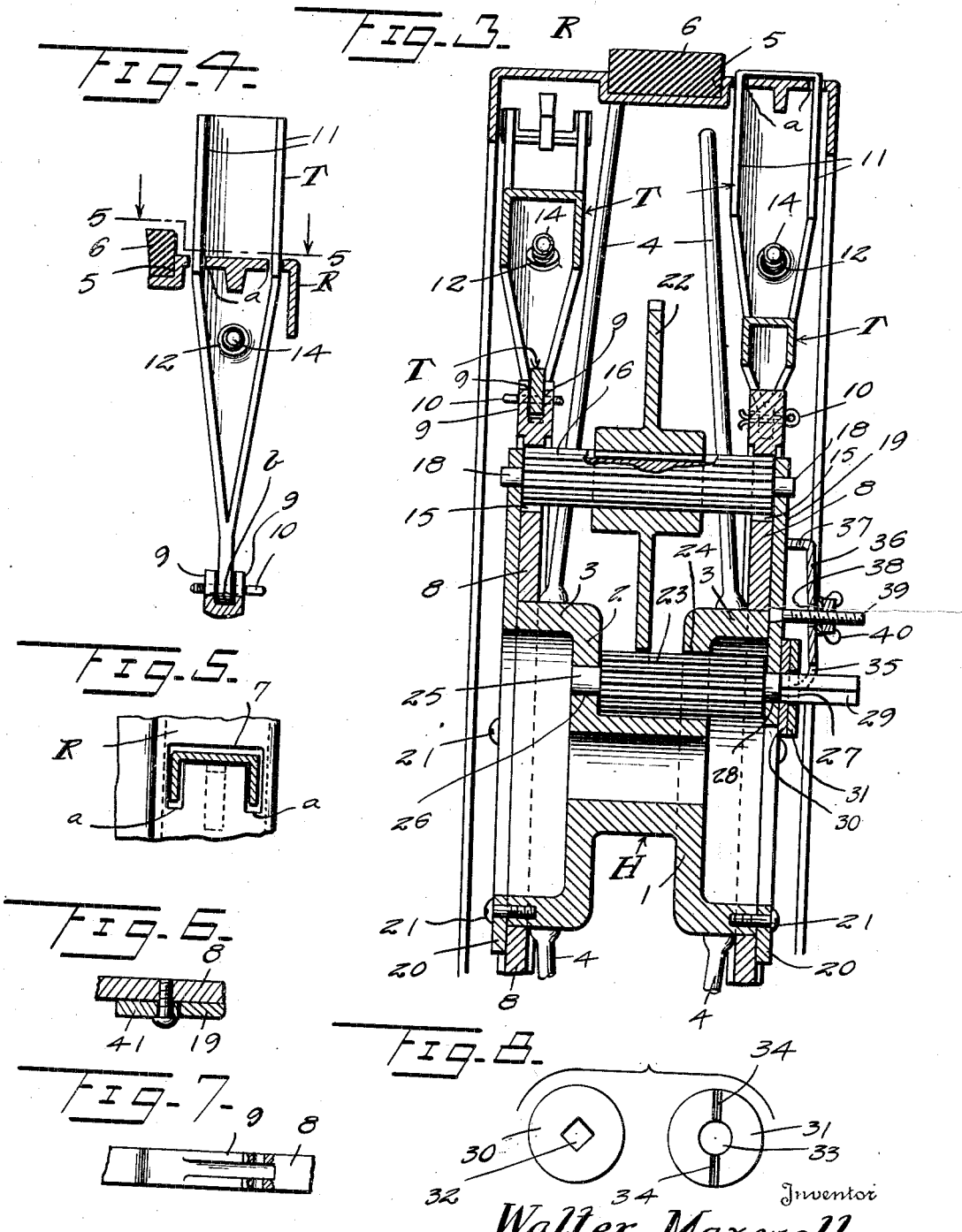

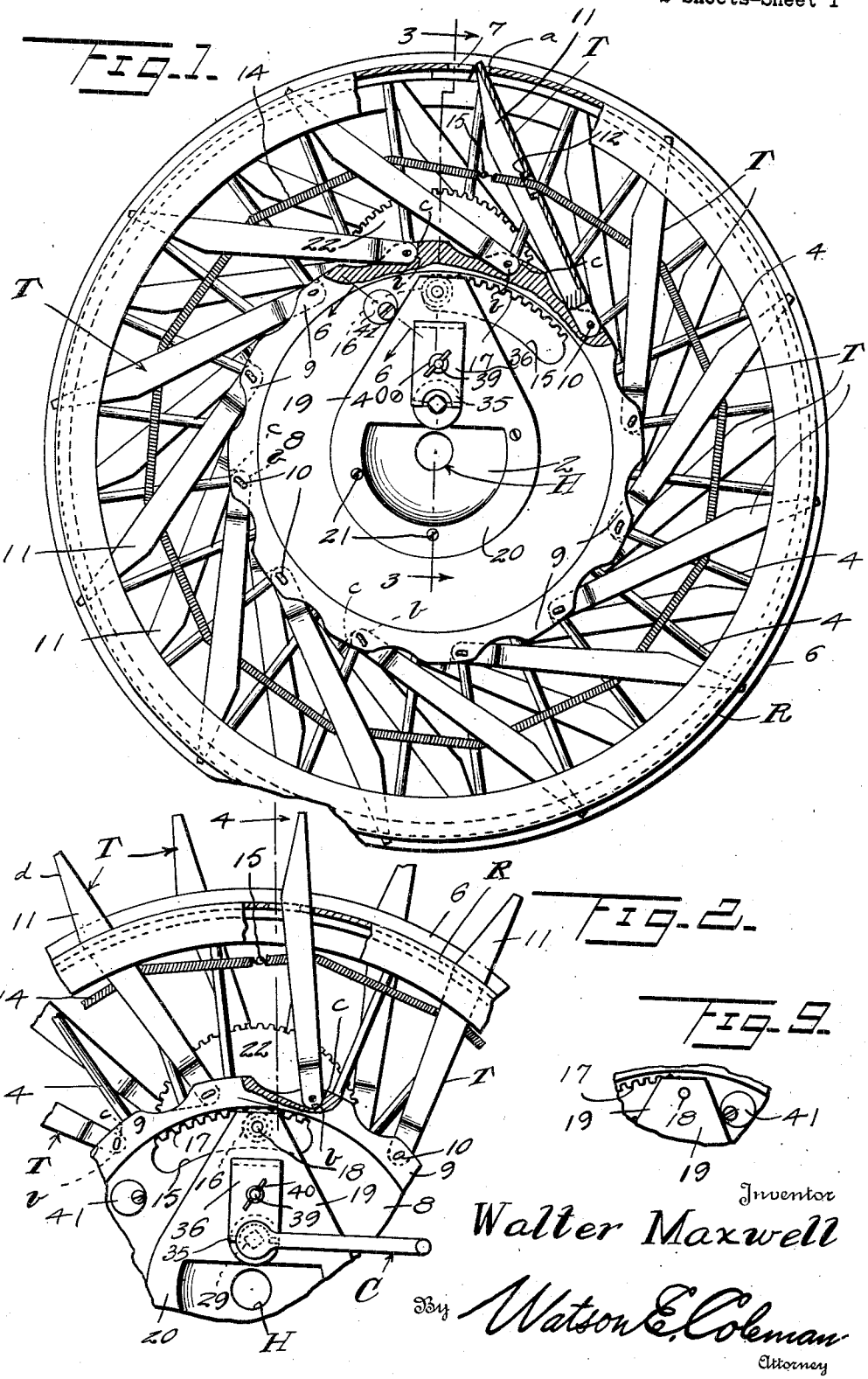

Patented Oct. 31, 1939

2,178,105

UNITED STATES PATENT OFFICE 2,178,105

TRACTION WHEEL

Walter Maxwell, Marshfield, Wis., assignor of one-tenth to Harry G. Hambright, one-tenth to James B. Vedder, one-tenth to Arthur Merkel, one-tenth to Ira Jones, and one-tenth to Raymond R. Williams, all of Marshfield, Wis.

Application March 11, 1939, Serial No. 261,363

5 Claims. (Cl. 301—46)

This invention relates to a traction wheel, and it is an object of the invention to provide a wheel of this kind employing a plurality of traction lugs together with means for extending and retracting said lugs as desired and wherein said lugs are mounted in a manner to be free of rattle at all times.

It is also an object of the invention to provide a device of this kind including a series of traction lugs operatively engaged with a rotatable member whereby upon rotation of said rotatable member in one direction the traction lugs will be extended beyond the periphery of the wheel to increase the ground gripping action of the wheel.

An additional object of the invention is to provide a traction wheel including a series of traction lugs carried by the wheel in a manner to be readily extended or retracted with respect to the tread of the wheel and wherein means are provided for effectively locking the traction lugs in desired adjustment with respect to the tread of the wheel.

The invention consists in the details of construction and in the combination and arrangement of the several parts of my improved traction wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in side elevation and partly in section illustrating a traction wheel constructed in accordance with an embodiment of my invention with the traction lugs fully retracted;

Figure 2 is a fragmentary view partly in side elevation and partly in section of the wheel as herein comprised with the traction lugs extended;

Figure 3 is an enlarged detailed sectional view taken substantially on the line 3—3 of Figure 1;

Figure 4 is a detailed sectional view taken substantially on the line 4—4 of Figure 2;

Figure 5 is a detailed sectional view taken substantially on the line 5—5 of Figure 4;

Figure 6 is a detailed sectional view taken substantially on the line 6—6 of Figure 1;

Figure 7 is a fragmentary view in edge elevation of one of the rotatable members as herein comprised with a portion broken away;

Figure 8 is a view in plan of the two clutch or locking members as herein embodied;

Figure 9 is a fragmentary elevational view at the side opposite from Figure 1 and illustrating a second adjustment cam.

As disclosed in the accompanying drawings, my improved traction wheel comprises a hub H of desired dimensions and which is provided at its opposite end portions with the surrounding flanges 1 and 2. These flanges 1 and 2 each have their peripheral portion defined by an outstanding flange 3 substantially at right angles thereto.

Concentric to the hub H is a rim R of desired dimensions and which is connected to the hub through the interposed spokes 4. These spokes, as particularly illustrated in Figure 3, are operatively connected with the central portion of the rim R and with the flanges 3 although I do not wish to be understood as limiting myself to any particular style of wheel.

The rim R, as herein disclosed, is provided at its transverse center with a circumferentially disposed channel 5 in which is fitted a tire 6 of rubber or such other material as may be preferred.

The rim R at opposite sides of the channel 5 is provided therearound with the circumferentially and equidistantly spaced slots 7. Each of these slots 7 as particularly illustrated in Figure 5 is substantially U-shaped in form with the side portions $a$ of the slot disposed rearwardly of the rim R with respect to its direction of rotation.

Snugly mounted upon each of the flanges 3 and having independent rotation thereon is a disk or plate 8 of desired dimensions and the peripheral portion of this plate 8 is provided circumferentially therearound with the equidistantly spaced pairs of ears 9. Between each pair of ears 9 is received an end portion of a traction lug T and said end portion of the lug T is pivotally connected to its associated ears 9 by a cotter pin 10 or otherwise as may be desired. This inner or pivoted end portion of the traction lug T is rounded, as at $b$, and said rounded end $b$ has close contact at all times with a shoulder $c$ provided adjacent to similar ends of the ears 9 of a pair. By this arrangement the cotter pin 10 is relieved of stress when the lug T is extended for tractive engagement with the surface over which the tractor is travelling.

In the present embodiment of my invention, each of the traction lugs T is substantially straight from end to end and is of a channel formation with the side flanges 11 thereof gradually increasing in width from the inner end thereof to a point adjacent the outer end. The outer portions, however, of these flanges 11 are inwardly tapered, as at d, to facilitate the penetration of the outer extremity of the lug into the surface over which the wheel may travel and also to facilitate maintaining clean said outer end portion of the traction lug.

The outer portion of each of these lugs T passes through a slot 7 and each of the lugs is of a length that when said lug is fully retracted the outer end portion thereof will still remain within the slot 7 and substantially flush with the outer peripheral surface of the adjacent portion of the rim R.

As is clearly illustrated in the accompanying drawings, the lugs T of the wheel are arranged in two series one at each side of the wheel and the lugs T of each series is associated with a common disk or plate 8. Upon rotation of a disk or plate 8 in one direction the lugs T will be extended, as illustrated in Figure 2, and upon rotation of the disk or plate 8 in the opposite direction said traction lugs T will be retracted, as illustrated in Figure 1. The lugs T intermediate their ends and at a point inwardly of the rim R are provided with the openings 12 and through these openings 12 of each series of lugs T is freely threaded a coil spring 14. The extremities of this coil spring 14 are coupled together, as at 15, and this spring 14 is always under tension so that when the lugs T of a series are fully retracted or extended to any desired degree the spring 14 will hold the lugs T of the associated series in close contact with the shoulders b and the rim R thus eliminating rattle and at the same time eliminating the wear which would otherwise occur should the lugs T be permitted to chatter.

As is illustrated in Figure 5, the slot 7 closely conforms to the cross sectional configuration of that portion of a traction lug T passing therethrough. This is of advantage as it provides means for maintaining said outer portion of the lug clean as any mud or other matter retained by the lug when extended will be forced off when the lug T is fully retracted.

It is also to be pointed out that when the lugs T of a series are extended the tension of the spring 14 will increase in accordance with the degree of extension of said lugs. This is of importance because such increased tension of the spring 14 provides means for automatically retracting the traction lugs T as will hereinafter be more particularly pointed out.

It is, of course, important that the lugs T of both series be extended or retracted in unison and in order to accomplish this the disks or plates 8 move together and in the same direction. As herein disclosed, the disks or plates 8 are provided in their peripheral portions with the arcuate slots 15 in which are received the extremities of a pinion 16. This pinion 16 is supported in a manner to constantly mesh with the rack 17 extending along side marginal edges of the slots 15 so that upon rotation of the pinion 16 in the desired direction the lugs T of both series will be either extended or retracted in unison.

In the present embodiment of my invention the opposite end portions of the pinion 16 are provided at the axial centers thereof with the outstanding stub shafts 18 which are rotatably engaged through a bearing plate 19 extending outwardly from the annular holding member 20 for a disk or plate 8. This annular member 20 contacts with the outer edge of a flange 3 and is held thereto by the tap screws 21 or otherwise as may be preferred. As particularly illustrated in Figure 3, the holding member 20 is of a width to overlie the inner portion of the adjacent plate or disk 8.

Mounted upon the central portion of the pinion 16 for rotation therewith is a gear wheel 22 which meshes with a second pinion 23. This pinion 23 is freely extended through an opening 24 in the flange 1 of the hub and the inserted end of this pinion 23 at the axial center thereof carries an outstanding trunnion 25 which is snugly and rotatably fitted within an opening 26 through the second flange 2. The opposite or outer end of the pinion 23 at the axial center thereof is provided with the outstanding elongated trunnion 27 which is snugly and rotatably disposed thru an opening 28 in the adjacent annular member 20 and at substantially the transverse center of the bearing plate 19. The outer portion of this trunnion 28 is angular in cross section, as at 29, whereby an operating crank C or other suitable implement may be engaged therewith for rotating the spline 23 as desired.

Rotation of this pinion 23 in one direction will result in an outward adjustment of the traction lugs T and when these lugs T are extended as desired they are effectively held or locked in such position by a suitable braking means. As herein disclosed this braking means comprises two overlying disks 30 and 31. The disk 30 has a central opening 32 of such configuration as to snugly engage the portion 29 of the trunnion 28 for rotation therewith. This disk 30 when applied also has direct contact with the adjacent annular member 20 and the inner portion of the bearing plate 19. After the disk 30 has been applied the second disk 31 is placed upon the trunnion 28. It is to be noted that the central opening 33 of this disk 31 is of such diameter as to allow the trunnion 28, or more particularly the angular portion 29 thereof, to freely turn independently of the disk 31.

The outer face of the disk 31 at opposite sides of its central opening 33 is provided with the radially aligned grooves 34 in which are received the transversely disposed and inwardly directed lugs 35 carried by an end portion of a plate 36. The opposite end portion of the plate 36 is defined by the transversely disposed flange 37 which has contact with the adjacent bearing plate 19 whereby the plate 36 may have swinging movement to regulate as may be desired the frictional contact between the disks 30 and 31. As particularly illustrated in Figure 3, the central portion of the plate 36 is provided with an opening 38 through which is freely directed a threaded shank 39 carried by the adjacent bearing plate 9. Engaged with this threaded shank 39 outwardly of the plate 36 is a wing nut 40. By turning the nut 40 in one direction the plate 36, or more particularly the lugs 35 thereof, will swing inwardly toward the bearing plate 19 or the member 20 to increase the frictional contact between the disks 30 and 31 while, of course, rotation of the member 40 in the opposite direction will correspondingly reduce such frictional contact. The nut or member 40 may be adjusted to have the frictional contact between the disks 30 and 31 create a braking action sufficient to hold the lugs T at their desired extended position.

With the lugs T extended and locked or held in such position by the braking action of the disks 30 and 31, when it is desired to retract the lugs T it is only necessary to operate the member or nut 40 to release the braking contact between the disks 30 and 31 whereupon the tension of the spring 14 will operate automatically to return the lugs T to their fully retracted position.

Under many conditions the length of a slot 15 may determine the extent of rotation of a disk or plate 8 but in order to regulate such movement of the disk or plate 8 and particularly in the direction for retracting the lugs T, each of the disks or plates 8 in the present embodiment of my invention carries a cam or eccentrically mounted stop 41 for coaction with a bearing plate 19. Contact of this stop 41 with the bearing plate 19 limits the extent of movement of the disk or plate 8 and at the same time determines the extent of inward movement of the traction lugs T. This movement can be readily regulated as required upon proper adjustment of the stop 41.

From the foregoing description it is thought to be obvious that a traction wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A traction wheel comprising a hub, a surrounding rim operatively engaged with the hub, a plate rotatably mounted upon the hub, a member fixed to the hub for holding the plate thereon, an annular series of traction lugs, means for pivotally connecting the inner end portions of the lugs to the rotatable plate, said rim having means for supporting and guiding the outer portions of the lugs, means for rotating the plate in a direction to extend the lugs, means adapted to hold the plate against reverse rotation when the lugs are extended, means for retracting the lugs and reversely rotating the plate upon release of the means for holding the plate against reverse rotation, and a stop eccentrically mounted on the plate for coaction with the holding member to regulate the extent of reverse travel of the rotatable plate.

2. A traction wheel comprising a hub, a surrounding rim operatively engaged with the hub, a plate rotatably mounted upon the hub, an annular series of traction lugs, means for pivotally connecting the inner end portions of the lugs to the rotatable plate, said rim having means for supporting and guiding the outer portions of the lugs, means for rotating the plate in a direction to extend the lugs, means adapted to hold the plate against reverse rotation when the lugs are extended, and a contractile spring common to all of the lugs and freely engaging the lugs outwardly of the pivotal connection of the lugs with the plate to provide means to retract the lugs and reversely rotate the plate upon release of the holding means.

3. A traction wheel comprising a hub, a surrounding rim operatively engaged with the hub, plates rotatably mounted upon the opposite end portions of the hub, said plates being provided with slots having marginal edges provided with arcuate racks, members fixed to the hub outwardly of the plates to hold the plates on the hub, traction lugs having their inner end portions pivotally engaged with the rotatable members, a rim having means for supporting and guiding the outer portions of the lugs, a pinion rotatably supported by said members and bridging the space therebetween, said pinion extending through the slots of the plates and meshing with the arcuate racks, a second pinion rotatably carried by the hub for rotating the first pinion, the second pinion having an outstanding trunnion to provide means for rotating the same, a braking means coacting with said trunnion for holding the same against rotation, turning movement of the second pinion in one direction resulting in travel of the rotatable plates in such direction to move the traction lugs outwardly beyond the rim, and means for retracting the traction lugs and maintaining said lugs retracted when the braking means is ineffective.

4. A traction wheel comprising a hub, a surrounding rim operatively engaged with the hub, a plate rotatably mounted upon the hub, an annular series of traction lugs, means for pivotally connecting the inner end portions of the lugs to the rotatable plate, said rim having means for supporting and guiding the outer portions of the lugs, means for rotating the plate in a direction to extend the lugs including a rotatable member operatively supported by the hub, said member having a trunnion to provide means for operating the hub to rotate the plate, coacting braking means operatively carried by the hub and by the trunnion adapted to hold the plate against reverse rotation after the plate has been rotated in a direction to extend the lugs, and means engaging all of the lugs and carried by the lugs for reversely rotating the plate and retracting the lugs upon release of the braking means.

5. A traction wheel comprising, in combination, a rim, an annular series of spaced traction lugs, means for supporting the lugs to extend the same beyond the rim, means for extending the lugs, a single braking means for holding all of the lugs extended, and a retractile member carried by and common to all of the lugs for retracting the lugs upon release of the braking means.

WALTER MAXWELL.